United States Patent
Sella et al.

(10) Patent No.: US 11,042,635 B2
(45) Date of Patent: Jun. 22, 2021

(54) USER INTERFACE FOR RESPONDING TO WIRELESS ATTACKS

(71) Applicant: Cisco Technology, Inc., San Jose, CA (US)

(72) Inventors: Yaron Sella, Beit Nekofa (IL); Kevin W. Holcomb, Apex, NC (US); Subhasri Dhesikan, San Jose, CA (US); Raghuram S. Sudhaakar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 303 days.

(21) Appl. No.: 16/040,727

(22) Filed: Jul. 20, 2018

(65) Prior Publication Data
US 2020/0026852 A1 Jan. 23, 2020

(51) Int. Cl.
*G06F 21/56* (2013.01)
*G06F 9/4401* (2018.01)

(52) U.S. Cl.
CPC .......... *G06F 21/56* (2013.01); *G06F 9/4401* (2013.01)

(58) Field of Classification Search
CPC .......... G06F 21/56; G06F 21/70; G06F 21/82; G06F 21/606; G06F 21/6218; B06K 2370/12
See application file for complete search history.

(56) References Cited

U.S. PATENT DOCUMENTS

2011/0302144 A1* 12/2011 Hamilton, II .......... G06Q 10/00
                                                    707/705
2014/0294180 A1 10/2014 Link, II
2016/0357188 A1* 12/2016 Ansari ............... G06K 9/00805
2016/0364678 A1* 12/2016 Cao .......................... G06Q 50/30
2016/0381055 A1 12/2016 Galula et al.
2020/0020165 A1* 1/2020 Tran ....................... G06N 7/005

OTHER PUBLICATIONS

Chris Jenson, "Should Autonomous vehicles have manual overrides", Quora, Jan. 4, 2013 [Accessed Online Jul. 2, 2018] [<https://www.quora.com/Should-autonomous-vehicles-have-manual-overrides>].
Andy Greenberg, "Securing Driverless Carsfrom Hackers Is Hard. Askthe Ex-Uber Guy Whoprotects Them," wired.com, Apr. 12, 2017 [Accessed Online Jul. 2, 2018] [<https://www.wired.com/2017/04/ubers-former-top-hacker-securing-autonomous-cars-really-hard-problem/>].
Morgan, "The Practical Path to Driverless Cars," Citylab.com, Apr. 1, 2014 [Accessed Online Jul. 2, 2018] [<https://www.citylab.com/transportation/2014/04/practical-path-driverless-cars/8759/>].

* cited by examiner

*Primary Examiner* — Paul E Callahan
(74) *Attorney, Agent, or Firm* — Patterson + Sheridan, LLP (57) ABSTRACT

Many modern devices and machines (e.g., Internet of Things (IoT) devices and connected vehicles (CV)) include wireless interfaces that permit external devices to communicate with the devices and machines. These wireless interfaces can be attacked by malicious actors who can affect the operation of the devices or machines. Embodiments herein describe a user controlled actuator (e.g., a knob, set of buttons, switches, etc.) for responding to a wireless attack. Using the actuator, the user can set a response level depending on the threat. Each threat level can elicit a predefined action or set of actions from a control system in the device or machine.

20 Claims, 5 Drawing Sheets

USER INTERFACE FOR RESPONDING TO WIRELESS ATTACKS

TECHNICAL FIELD

Embodiments presented in this disclosure generally relate to an actuator which can be controlled by a user to respond to a wireless attack on a wirelessly connected device or machine.

BACKGROUND

Many modern devices and machines (e.g., Internet of Things (IoT) devices and connected vehicles (CV)) include wireless interfaces that permit them to communicate with external devices. These wireless interfaces can be attacked by malicious actors who can take control of the devices or machines. For example, security weaknesses in the wireless interfaces can be exploited such that a malicious actor can steal customer data from an IoT device or disable control systems in a CV (e.g., disable power steering or turn off the engine). A malicious actor can steal private information, eavesdrop on a user, or place the user in a dangerous situation.

Currently, the user has to reset the device or machine to stop the attack. For example, the user can power cycle the IoT device or turn off the CV to sever the link between the malicious actor and the IoT device and CV. However, turning off the CV may first require the user to drive the CV to a safe location which may be difficult to do if the malicious actor has disabled steering or propulsion systems. Further, if the IoT device being attacked is a large appliance, e.g., a refrigerator or microwave, it may be difficult to unplug the appliance. Thus, it may be difficult for a user to respond to an attack by resetting (or turning off) the device or apparatus.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a connected system that includes an actuator configured to output a threat level selected from a plurality of threat levels, each of the plurality of threat levels representing a different likelihood of a wireless attack on the connected system and a control system. The control system includes a plurality of computing units each configured to control a respective subsystem in the connected system and a boot controller communicatively coupled to the actuator to receive the outputted threat level, where the boot controller is configured to select a predefined action corresponding to the outputted threat level, where the predefined action comprises rebooting at least one computing unit of the plurality of computing units, and transmit an instruction to reboot the at least one computing unit, where the at least one computing unit comprises a wireless interface permitting the connected system to communicate with at least one of an external device and a network.

Another embodiment described herein is a vehicle that includes an actuator configured to output a threat level selected from a plurality of threat levels and a control system. The control system includes a plurality of electronic control units (ECUs) each configured to control a respective subsystem in the vehicle and a boot controller communicatively coupled to the actuator to receive the outputted threat level. The boot controller is configured to select a predefined action corresponding to the outputted threat level, wherein the predefined action comprises rebooting at least one ECU of the plurality of ECUs and transmit an instruction to reboot the at least one ECU, wherein the at least one ECU comprises a wireless interface permitting the vehicle to communicate with at least one of an external device and a network.

Another embodiment described herein is a method that includes generating, via a movement of an actuator, a signal indicating a selection of one of a plurality of threat levels of a wireless attack to a connected system, selecting a predefined action corresponding to the selected threat level where the predefined action comprises rebooting at least one computing unit of a plurality of computing units, and transmitting an instruction to reboot the at least one computing unit, wherein the at least one computing unit comprises a wireless interface permitting the connected system to communicate with at least one of an external device and network.

Example Embodiments

Embodiments herein describe a user controlled actuator (e.g., a knob, set of buttons, switches, etc.) for responding to a wireless attack. Using the actuator, the user can set a response level depending on the perceived threat. For example, if the user is suspicious that a device or machine (e.g., an IoT device or a CV) is being attacked wirelessly, she can set a low threat level. However, if the user sees direct evidence of a potential wireless attack (e.g., a camera in the device activates without user instruction or a power steering is disabled), the user can set a higher threat level (e.g., a medium or high threat level).

Each threat level can elicit a predefined response from a control system in the device or machine. For example, for a low threat level, the control system may reset or reboot a computing unit hosting the wireless interface. Doing so disconnects the device or machine from the malicious actor. For a medium threat level, the control system may reboot the computing units hosting the wireless interface as well as the control units directly connected to computing units hosting that wireless interface. For a high threat level, the control may reboot the control units but also leave the wireless interface in an inactive state. Further, the user controlled actuator may be hardwired to a boot controller in the control system, so that the malicious actor cannot prevent the actuator from changing the threat levels in order to stop the malicious actor from communicating with the device or machine or ignore the reset command altogether.

Figure 1:
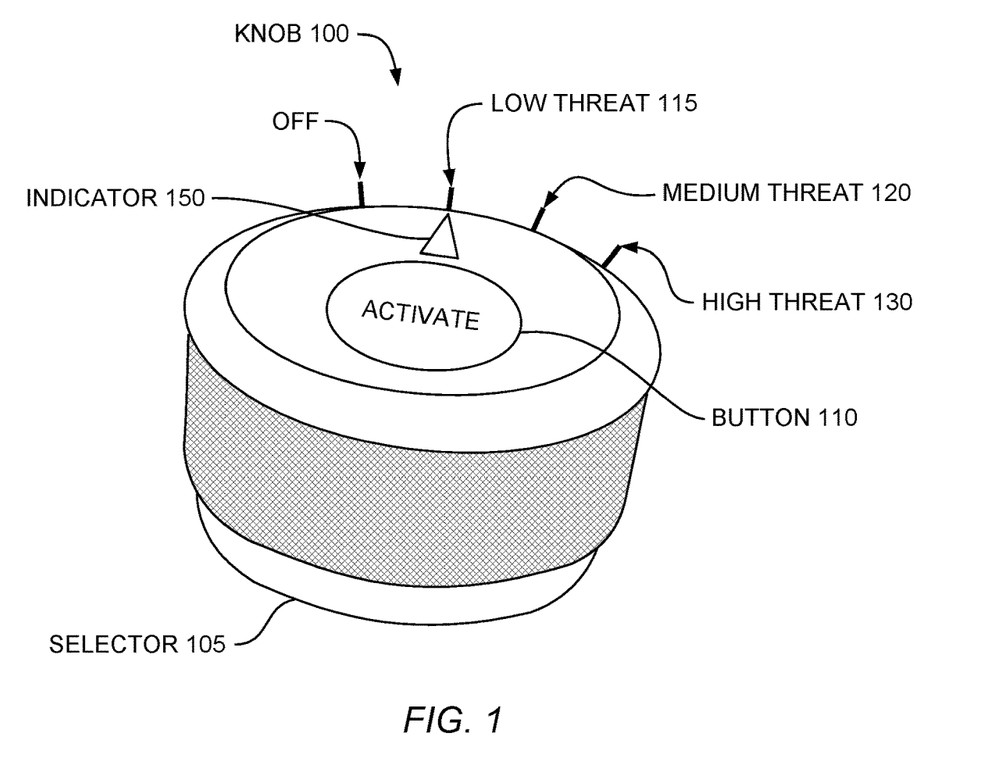
FIG. 1 illustrates a knob with multiple settings for responding to a wireless attack, according to one embodiment described herein.

FIG. 1 illustrates a knob 100 with multiple settings for responding to a wireless attack, according to one embodiment described herein. The knob 100 may be disposed on an IoT device or a CV which permits a user to indicate a perceived threat to the IoT device or CV from a wireless attack. For example, knob 100 may be mounted on the dashboard or a shifter box in a CV. If the IoT device is an appliance such as a refrigerator, stove, or microwave, the knob 100 can be mounted on a faceplate with other digital or manual controls. The knob 100 may also be mounted on wirelessly connected healthcare devices such as a computed tomography (CT) scanner or magnetic resonance imaging (MRI) scanner.

The knob includes a selector 105 which rotates around a button 110. The selector 105 includes an indicator 150 (an arrowhead in this example) which points to one of a plurality of threat levels: e.g., a low threat 115, a medium threat 120, and a high threat 130. Put differently, the user can rotate the selector 105 to a unique predefined setting so that the indicator 150 points to the threat level which corresponds to a belief of the user that a device or machine is under a wireless attack. The threat levels can represent (from the perspective of the user) the likelihood of a wireless attack. For example, if the user is worried (but has not seen actual proof) that the device or machine is under wireless attack, she may move the selector 105 so that the indicator 150 points to the low threat 115. However, if the user has seen evidence which she believes is the result of a wireless attack, she can move the indicator 150 to point to the medium threat 120 or high threat 130.

After moving the indicator 150 to the perceived threat level, the user can press the button 110 which instructs a control system in the device or machine to perform a predefined response corresponding to the current threat level set by the selector 105. In this example, the knob 100 includes multiple actuators (e.g., the rotating selector 105 and the button 110) for selecting a perceived threat level. While FIG. 1 illustrates a knob 100, other actuator type devices can also be used such as three buttons or three switches which each corresponds to one of the threat levels.

Instead of the knob 100 or other type of physical actuator, the user can set a threat level using a software controlled input device such as a touch screen. For example, the IoT device or CV may include a touch screen display which can display three virtual buttons which the user can activate. However, one potential disadvantage of using a software controlled input device is that the malicious actor may be able to deactivate the device as part of the wireless attack. In contrast, if the input device used to set the threat level is a physical actuator, the malicious actor may be unable to prevent the user from changing the threat level.

Figure 2:
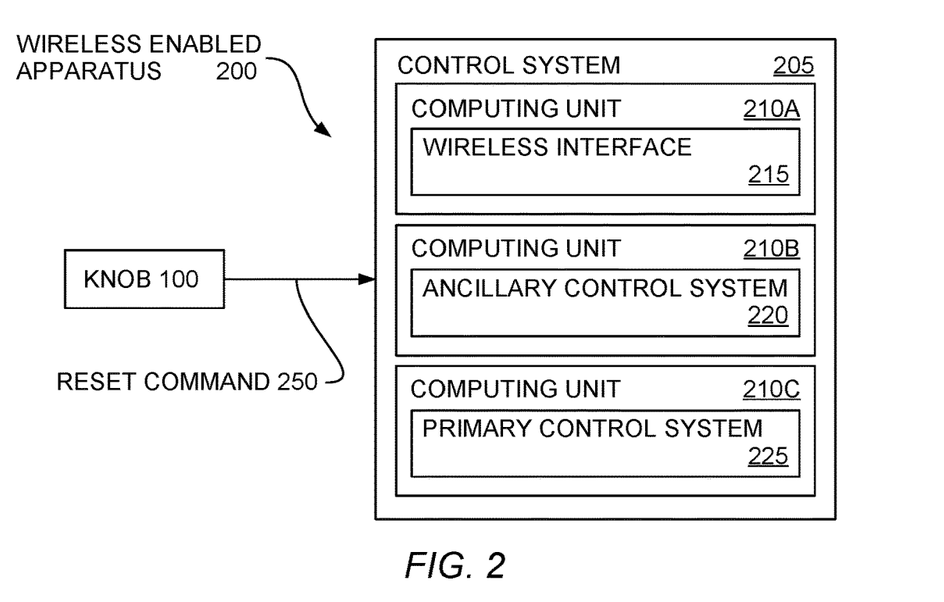
FIG. 2 illustrates a wireless enabled apparatus with various computing units vulnerable to wireless attack, according to one embodiment described herein.

FIG. 2 illustrates a wireless enabled apparatus 200 with various computing units vulnerable to wireless attack, according to one embodiment described herein. The apparatus 200 can be an IoT device, CV, or any other apparatus which is vulnerable to a wireless attack. The apparatus 200 includes the knob 100 which is communicatively coupled to a control system 205. As shown, the knob 100 can send a reset command 250 which indicates the user selected threat level to the apparatus 200.

The control system 205 includes a plurality of compute units 210 which are tasked with handling various systems, modules, functions, and interfaces in the apparatus 200. In this example, the compute unit 210A hosts a wireless interface 215 which permits the apparatus 200 to wirelessly communicate with external devices. For example, the wireless interface 215 may use Wi-Fi, Bluetooth®, Zigbee®, 3G/4G/5G cellular signals, and the like to communicate with an external device. However, a malicious actor can exploit weaknesses in the wireless interface 215 to affect the control system 205. That is, a malicious actor can use the wireless interface 215 as a gateway in order to control or affect the operation of the computing unit 210A or the other computing units 210B or 210C in the control system 205.

The computing unit 210B hosts an ancillary control system 220 that controls a function in the apparatus 200 that is deemed non-critical to operation of the apparatus 200. For example, if the apparatus 200 is an IoT appliance, the ancillary control system 220 may control a display screen indicating the environment in the appliance—e.g., temperature or humidity—or a timer—e.g., a cook timer. If the apparatus 200 is a CV, the ancillary control system 220 may control the operation of a radio or windshield wipers in the car. In one embodiment, the ancillary control system 220 can control any subsystem in the apparatus 200 that is determined to be a non-core function—e.g., a function that is not used to perform the primary purpose of the apparatus 200 or does not ensure the apparatus 200 operates safely.

The computing unit 210C hosts a primary control system 225 that controls a function in the apparatus 200 that is deemed critical to the operation of the apparatus 200. In one embodiment, the primary control system 225 controls a subsystem in the apparatus 200 that is determined to be a core function—e.g., a function that relates to the primary purpose of the apparatus 200 or the safe use of the apparatus 200. For example, if the apparatus 200 is an IoT appliance such a refrigerator, the primary control system 225 may control a compressor in the refrigerator that is part of the cooling system. If the apparatus 200 is a CV, the primary control system 225 may control the fuel injection system, the braking system, the power steering system, or the like. Rebooting or resetting a computing unit 210 that host a primary control system 225 may reduce the ability of the apparatus 200 to perform its primary purpose or operate safely.

In one embodiment, a malicious actor can infiltrate the control system 205 by uploading malicious code into transitory memory in the computing units 210 (e.g., RAM). The malicious code may permit the malicious actor to control or affect the subsystems in the apparatus 200. In one embodiment, the computing units 210 include a processor, read-only memory, and transitory memory. When booting the computing units 210 (e.g., when the apparatus 200 is first turned on), the control system 205 may use information in the read-only memories (ROM) in the computing units 210 to boot these units 210. By placing the code used to securely boot the units in the ROM, the control system 205 ensures that a malicious actor cannot affect the boot process. Put differently, the control system 205 can perform a secure boot using the information stored in the ROM.

After booting, the code in the ROM permits code stored in the transitory memory to begin executing on the processors in the computing units 210. In one scenario, a malicious actor can affect the operation of the computing units 210 by storing malicious code in the transitory memory. Stated differently, using vulnerabilities or flaws in the wireless interface 215, a malicious actor can store malicious code in the transitory memory in one of the computing units 210. The malicious code may affect the operation of the ancillary or primary control systems 220 or 225. For example, the malicious code may change the radio station, reorient the position of an MRI scanner, deactivate power brakes or steering, activate a microphone on an IoT device for eavesdropping, and the like. Moreover, the malicious actor can update the malicious code (e.g., send updated settings or commands which are executed on the processors in the computing units 210) in the transitory memory using the wireless interface 215. Thus, if the wireless interface 215 is disconnected, this eliminates the ability of the malicious actor to update the malicious code or receive data from the control system 205. For example, if the malicious actors is eavesdropping, deactivating the wireless interface 215 prevents the malicious actor from receiving additional data from a microphone or camera in the apparatus 200. Further, resetting or rebooting the computing units 210 flushes or empties any data stored in the transitory memory. Put differently, in one embodiment, forcing the computing units 210 to reboot deletes any malicious code that may have been stored in the transitory memory of the computing units 210. The computing units 210 can then perform a secure boot using the data stored in the ROM as described above.

The control system 205 receives the reset command 250, and in response to the threat level indicated in the command 250, performs a predefined action. That is, the control system 205 may perform a different predefined action for each of the threat levels. For example, for a low threat level, the control system 205 resets only the computing unit 210A which deactivates the wireless interface 215. Moreover, any malicious code stored on the computing unit 210A is deleted. However, the computing units 210B and 210C are permitted to continue operating as normal. For higher threat levels, the control system 205 resets both the computing units 210A and 210B which deletes any malicious code that may be stored in these units.

In one embodiment, the control system 205 does not reset the computing unit 210C regardless of the threat level reported in the reset command 250. For example, the primary control system 225 may ensure safe operation of a vehicle (e.g., control the braking system or fuel injection system). In another example, the primary control system 225 may perform a primary or critical function in the apparatus 200 such as the cooling system in a refrigerator or temperature control in an IoT thermostat. However, in other embodiments, the control system 205 may reboot the primary control system 225 in certain conditions such as, for example, when a CV is parked. In that case, the control system 225 reboots the primary control system 225 for the power steering, but only reboots the primary control system 225 controlling the brakes if the CV is stopped and the shifter is in park.

Figure 3:
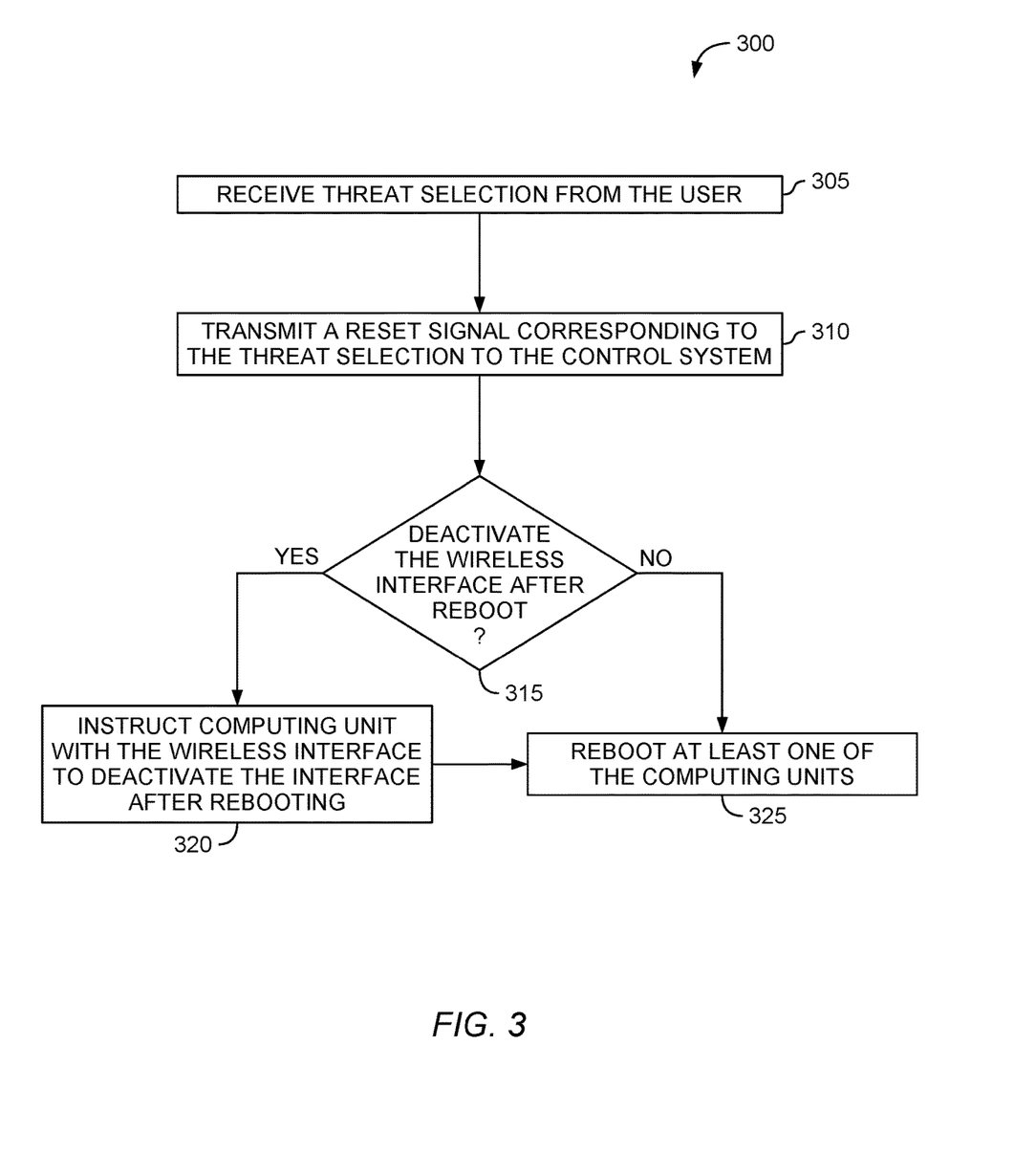
FIG. 3 is a flowchart for responding to a wireless attack, according to one embodiment described herein.

FIG. 3 is a flowchart of a method 300 for responding to a wireless attack, according to one embodiment described herein. At block 305, a user interface receives a threat selection from the user. For example, the user may turn the knob 100 in FIG. 1 and select the button 110 to set a threat level. However, the user can use any kind of user interface to input a perceived threat level such as buttons, switches, dials, a touch screen, and the like. In one embodiment, the user interface includes a physical actuator that is moved by the user to select the threat level. The user interface may not be software controlled. Put differently, the user interface can receive an input from the user without relying on functions performed by software executing on a processor.

At block 310, the user interface transmits a reset signal corresponding to the threat selection to the control system. For example, the user interface may transmit a digital or analog signal which represents one of a plurality of threat levels—e.g., low, medium, or high. The control system can decode the received signal to determine the threat level inputted by the user.

In one embodiment, the control system stores one or more predefined actions to take depending on the threat level. Put differently, in response to the threat level provided by the user interface, the control system identifies at least one predefined action to take. The predefined actions can vary depending on the selected threat level. For example, the control system may perform a first action for a low threat level and a second, different action for a medium threat level. In another example, the control system may perform the first action for a low threat level and perform both the first and second actions for the medium threat level.

The predefined actions can include selecting one of more of the computing units in the control system and resetting or rebooting those units. As mentioned above, doing so may flush out the transitory memory in the computing units to remove malicious code that may be affecting the operation of the units. In another example, the predefined actions may include deactivating the wireless interface (which can be done with or without rebooting the computing unit hosting the wireless interface).

At block 315, the control system determines whether the predefined action for the threat level includes deactivating the wireless interface after rebooting the computing unit hosting the wireless interface. That is, for some threat levels, the wireless interface (or wireless interfaces) may be reactivated after the computing unit hosting the interface completes the reboot. However, for other threat levels, the wireless interface or interfaces remain deactivated after rebooting the host computing unit.

If the wireless interface should remain inactive, the method 300 proceeds to block 320 where the control system instructs the computing unit with the wireless interface to deactivate the interface after rebooting. If not, the method 300 proceeds to block 325 where the control system reboots at least one of the computing units. That is, in method 300, at least one of the predefined actions for each threat level includes rebooting one of the computing units. However, in other embodiments, a threat level may include temporarily deactivating a wireless interface (using software) rather than rebooting a computing unit. One potential disadvantage of this approach, however, is that the malicious actor may upload malicious code that disables this feature, and thus, the control system may be unable to disable the wireless interface using software and the processor in the computing unit. As described below, the control system may be designed so that the user interface can always cause a computing system to reboot (thereby disabling the wireless interface) without relying on software or higher level functions of the processor in order to start the reboot process.

Figure 4:
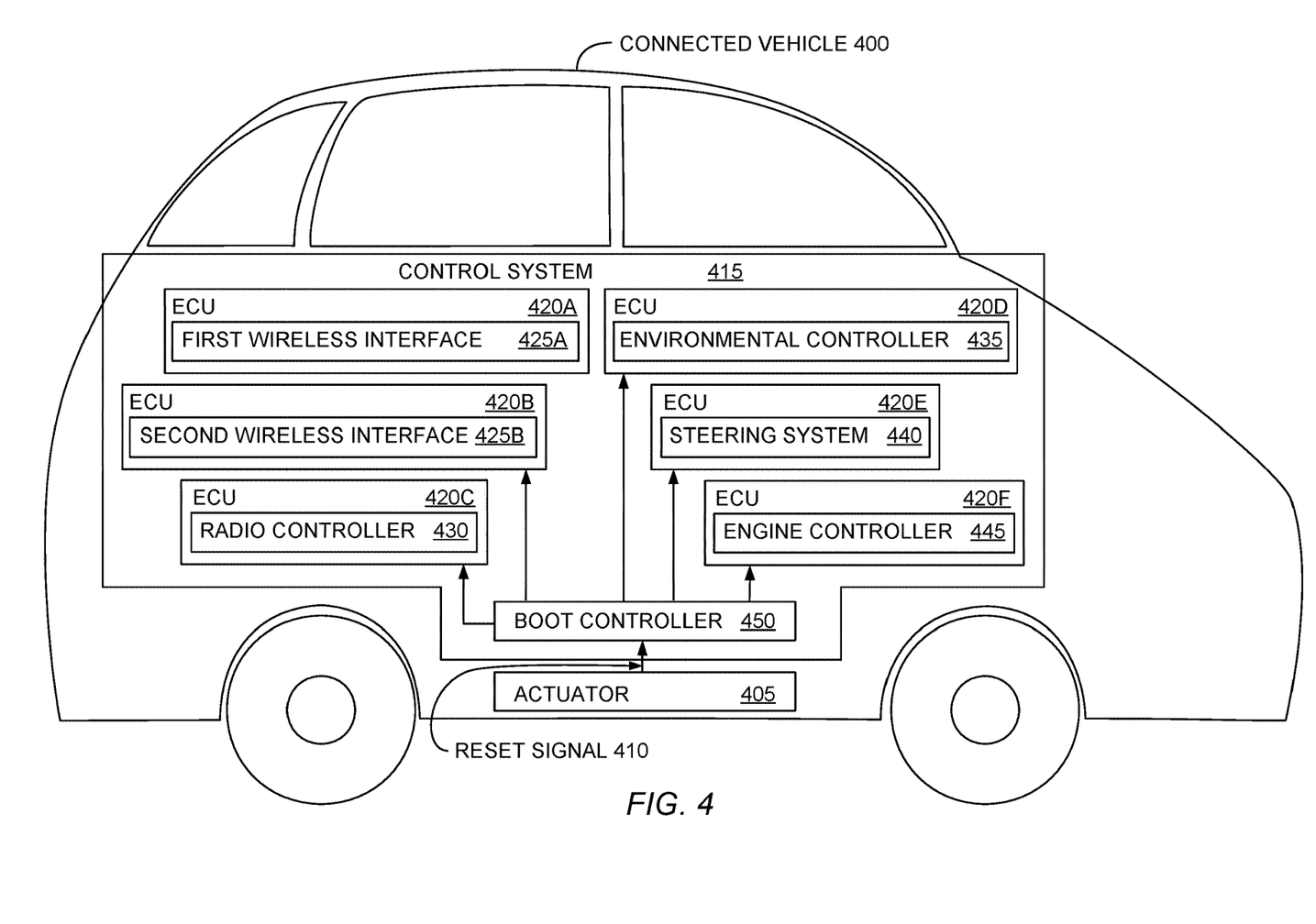
FIG. 4 is a CV with electronic control units vulnerable to wireless attack, according to one embodiment described herein.

FIG. 4 is a CV 400 with electronic control units (ECUs) 420 vulnerable to wireless attack, according to one embodiment described herein. The CV 400 is one example of the apparatus 200 in FIG. 2 with a control system 415 that includes multiple computing units (i.e., the ECUs 420). The CV 400 also includes an actuator 405 for receiving user input regarding a perceived threat to the CV 400. In this example, the actuator 405 is physically moved by the user in order to make a threat selection (e.g., twisting a knob, pressing a button, flipping a switch, etc.) but in other embodiments could be a software controlled user interface that does not use physical actuation to receive a user selection.

The actuator 405 outputs a reset signal 410 to the control system 415 indicating the user selected threat level. As described above, the reset signal 410 may indicate one of a plurality of threat levels currently selected by the user. In this example, the reset signal 410 is received at a boot controller 450 in the control system 415. The boot controller 450 includes connections to the various ECUs 420 in the control system 415. Using these connections, the boot controller 450 can force the ECUs to reboot. That is, in response to the reset signal 410, the boot controller 450 can identify one or more of the ECUs 420 to reboot and use its respective communication lines to the ECUs 420 to force the selected ECU or ECUs 420 to reboot.

In one embodiment, the boot controller 450 may be immune to wireless attacks. For example, the boot controller 450 may include read-only memory or unalterable firmware which cannot be changed by a remote user. The boot controller 450 may be protected or secure so that the control system 415 can guarantee that the reset signal 410 results in one or more of the ECUs 420 rebooting to prevent wireless access to the control system 415, or to remove malicious code.

The ECUs 420 can host different types of applications or perform different functions. For instance, the ECU 420A includes a first wireless interface 425A while the ECU 420B includes a second wireless interface 425B. The first wireless interface 425A may be a long-range wireless communication interface which permits the control system 415 to communicate with, for example, a cellular network. In contrast, the second wireless interface 425B may be a short-range wireless interface which can connect directly to a portable user device (e.g., a laptop, tablet, or mobile phone). A malicious actor can exploit weaknesses in one or both wireless interfaces 425. As such, depending on the user selected threat level, the boot controller 450 may reboot both ECUs 420A and 420B.

The ECU 420C hosts a radio controller 430 while the ECU 420D hosts an environmental controller 435. In one embodiment, these ECUs performs ancillary functions in the CV 400. That is, the radio controller 430 and environmental controller 435 may perform non-critical functions in the CV 400 such as controlling an entertainment system (e.g., a radio, video player, navigation, etc.) or the temperature in the car (e.g., air conditioning, heater, etc.). Because these systems may not relate to the primary purpose of the CV 400 (e.g., transportation) or the safety of the CV 400 or the people in the CV 400, they can be deemed as non-critical ancillary functions or subsystems.

In contrast, the ECU 420E hosts a steering system 440 and the ECU 420F hosts the engine controller 445 which may be deemed critical or primary functions or subsystems in the CV 400. These ECUs 420 may not be rebooted by the boot controller 450 in response to the reset signal 410. For example, because the steering system 440 and the engine controller 445 directly affect the primary purpose or purposes of the CV 400 (and/or its operational safety), the boot controller 450 may not reboot the ECUs 420E and 420F. However, the ECUs 420A-420D may be rebooted depending on the different user selected threat levels as discussed below.

Figure 5:
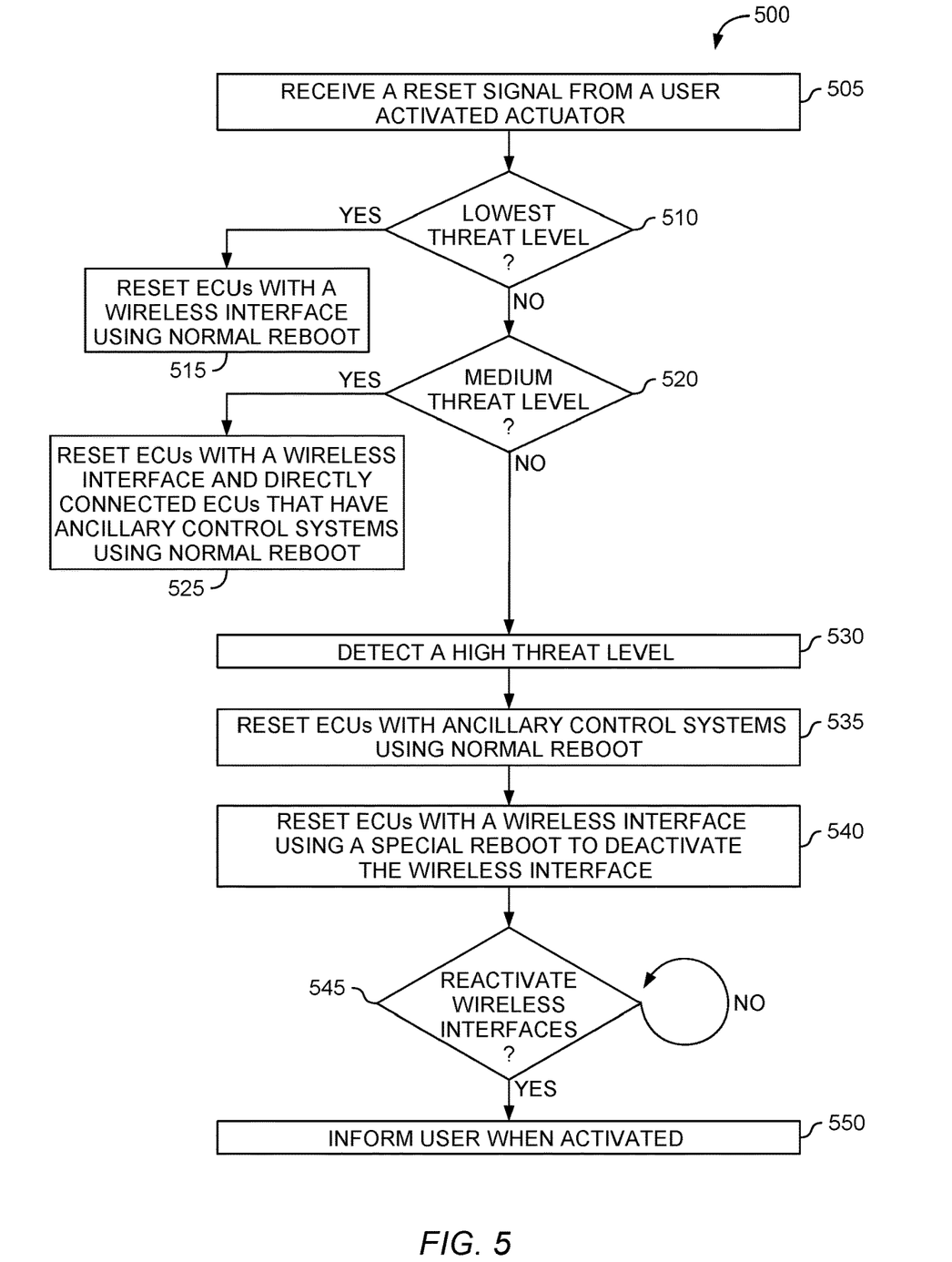
FIG. 5 is a flowchart for rebooting electronic control units in response to a wireless attack, according to one embodiment described herein.

FIG. 5 is a flowchart of a method 500 for rebooting electronic control units in response to a wireless attack, according to one embodiment described herein. At block 505, the boot controller receives a reset signal from a user activated actuator in the vehicle. In one embodiment, the reset signal is received from a hardware controlled actuator which is not controlled by software in the vehicle. Thus, if the malicious actor gains control of software or code executing in the vehicle, the actor cannot prevent the user from using the actuator to transmit the reset signal to the boot controller.

If at block 510 the reset signal indicates the lowest threat level, the method 500 proceeds to block 515 where the boot controller resets ECUs with a wireless interface using a normal reboot process. As a result, the wireless interfaces are disabled and the malicious actor (if relying on wireless communication with the vehicle to upload malicious code) is unable to affect the control system. Further, after rebooting, the ECUs can reactivate the wireless interface. Thus, if the user was using those wireless interfaces, they are again available.

However, if at block 520 the reset signal indicates the medium threat level, the method proceeds to block 525 where the boot controller resets the ECUs with a wireless interface and directly connected ECUs that have ancillary control systems. In one embodiment, the ECUs in the control system are interconnected to create a chain or web for sharing data. In response to a medium threat level, the boot controller reboots the ECUs that are directly connected to the ECUs containing the wireless interfaces but not the ECUs that are more than one hop away. That is, the boot controller does not reboot the ECUs that are indirectly connected to the ECUs with the wireless interfaces. However, in other embodiments, the boot controller may reboot the ECUs that are one or two hops away from the ECUs with the wireless interfaces, but not the ECUs that are three or more hops away. Generally, the more hops away an ECU is from the wireless interfaces, the more difficult it is for the malicious actor to access and affect these ECUs. As such, ECUs that are further along the chain from the ECUs with the wireless interfaces are less prone to attack, and thus, may not need to be rebooted (since they are less likely to have malicious code stored in their transitory memory).

In method 500, the boot controller does not reboot the directly connected ECUs if those ECUs contain a primary control system (e.g., the steering or propulsion systems). For example, if the ECU hosting the steering system and the ECU hosting the radio are both directly connected to the ECU hosting the Wi-Fi interface, the boot controller may reboot the ECUs hosting the Wi-Fi interface and the radio but not the ECU hosting the steering system.

Like in block 515, when rebooting the ECUs at block 525, the boot controller may perform a normal reboot where the functions hosted on the ECUs (e.g., the wireless interfaces and ancillary control systems) are reactivated or restarted when the reboot is complete.

In method 500, the user can select three threat levels. As such, if the reset signal is not the low or medium threat level, then at block 530 the boot controller detects that the reset signal indicates a high threat level. In response, at block 535 the boot controller resets the ECUs hosting ancillary control systems using a normal reboot. In one embodiment, the boot controller reboots all the ECUs in the control system that host an ancillary control system but does not reboot the ECUs hosting primary control systems. As such, if there is any malicious code on those ECUs, it is removed during the secure boot process as described above.

In one embodiment, the boot controller reboots one or more of the ECUs hosting a primary control system if the controller determines it is safe to do so. For example, if the vehicle is in park, the boot controller may reboot the steering system but not reboot the fuel injection system. In any case, once the ECUs have rebooted, the ancillary and primary control systems are activated and operate as normal.

At block 540, the boot controller resets the ECUs with the wireless interfaces using a special reboot to deactivate the wireless interface after the reboot is complete. That is, unlike in a normal reboot where the functions hosted by the ECUs are restarted or activated, here the boot controller provides an instruction to the ECUs to not reactivate the wireless interfaces after being rebooted. Doing so prevents a malicious actor from re-exploiting a weakness or security flaw in the wireless interface which permitted her to upload malicious code or otherwise affect the function of the ECUs.

At block 545, the boot controller (or the ECUs hosting the wireless interface) determines whether to reactivate the wireless interfaces. For example, the boot controller may wait ten seconds before reactivating the wireless interface to give the vehicle time to travel outside the wireless range of the malicious actor if, for example, the actor is using a short range communication protocol to access the vehicle. Thus, when the wireless interfaces are reactivated, the malicious actor is no longer able to communicate with the wireless interface.

At block 550, the control system informs the user when the wireless interfaces are reactivated. For example, a display panel in the vehicle may indicate the threat level selected by the user and the actions taken by the boot controller. The display can inform the user the wireless interfaces were disabled. When a predefined time is over (or when the vehicle has traveled a predefined distance), the display can alert the user that the wireless interfaces have been re-enabled. Thus, if the subsystems in the vehicle continue to behave abnormally, this may be an indicator of an electronic or structural malfunction rather than a malicious wireless attack. Nonetheless, if desired, the user can then use the actuator or a touch panel to instruct the control system to keep the wireless interfaces in a disabled state.

Figure 6:
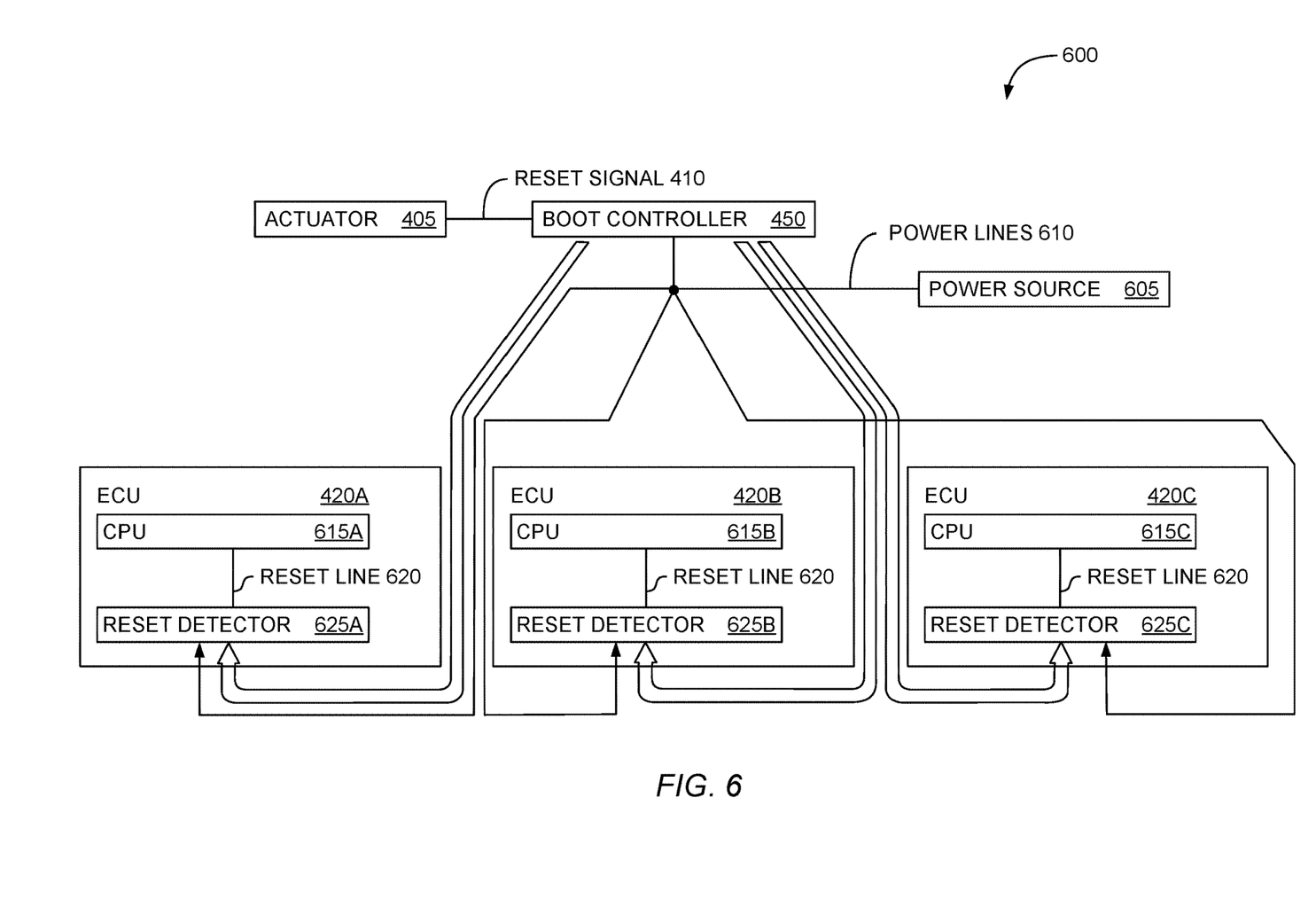
FIG. 6 illustrates coupling an actuator for responding to a wireless attack to a boot controller, according to one embodiment described herein.

FIG. 6 illustrates coupling the actuator 405 for responding to a wireless attack to the boot controller 450, according to one embodiment described herein. That is, FIG. 6 illustrates one example of a wired system 600 for forcing the ECUs 420 to reset in response to a user selected threat level. As shown, the actuator 405 is coupled to the boot controller 450 using one or more electrical wires so that the boot controller 450 can receive the reset signal. To transmit instructions to the ECUs 420, the boot controller 450 is communicatively coupled to power lines 610 which extend between a power source 605 (e.g., a battery, alternator, or generator) in the vehicle and the ECUs 420. In this example, the power lines 610 which are used to deliver DC or AC power to the ECUs 420 are leveraged to transmit digital data signals to the ECUs 420 which can force the ECUs 420 to reboot.

As shown, the power lines 610 are coupled to respective reset detectors 625 in each of the ECUs 420. In one embodiment, the reset detectors 625 include circuitry which can receive and decode the digital signals transmitted by the boot controller 450 as shown by the arrows. For example, the digital signals may indicate which of the ECUs 420 should reboot (e.g., the ECUs 420A and 420B) and which should not (e.g., the ECU 420C). In this manner, the boot controller 450 can determine which ECU 420 should reboot in response to the user selected threat level as describe in method 500.

Using the power lines 610 means additional wires do not have to be run between the boot controller 450 and the ECUs in order to force the ECUs 420 to reboot in response to the user selected threat levels. However, the system 600 is just one example of connecting the boot controller 450 to the ECUs 420. In one embodiment, the boot controller 450 is connected to the ECUs 420 in a way that ensures the reboot signals can reach the reset detectors 625 without a malicious actor being able to disable the boot controller 450 or the communication paths between the controller 450 and the ECUs 420.

In one embodiment, the reset detectors 625 are separate circuitry in the ECU 420 which is not controlled by any other component in the ECU 420. For example, the CPUs 615 in the ECUs 420 may be unable to control or affect the operation of the reset detector 625. That way, if a malicious actor gains control of the CPU 615, she cannot use the CPU 615 to disable the reset detector 625 and thus prevent the ECUs 420 from rebooting.

While the reset detectors 625 may not receive control data from the CPUs 615, the reset detectors 625 are attached to respective reset lines 620 which force the CPUs 615 to reboot the ECUs 420 when activated. That is, each reset detector 625 is hardwired to the CPU 615 so that the reset detector 625 can initiate a reboot in response to an instruction received from the boot controller 450. In this manner, the boot controller 450 can transmit data messages to the ECUs 420 which can selectively initiate the reboot process. Further, the instructions can indicate whether the reboot should be a normal reboot (where the functions performed by the ECUs 420 are reactivated after the reboot) or a special reboot where the functions remain deactivated.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A connected system, comprising:
   an actuator configured to output a threat level selected from a plurality of threat levels, each of the plurality of threat levels representing a different likelihood of a wireless attack on the connected system;
   a control system comprising:
      a plurality of computing units each comprising logic and configured to control a respective subsystem in the connected system;
      a boot controller communicatively coupled to the actuator to receive the outputted threat level, wherein the boot controller is configured to:
         select a predefined action corresponding to the outputted threat level, wherein the predefined action comprises rebooting at least one computing unit of the plurality of computing units; and
         transmit an instruction to reboot the at least one computing unit, wherein the at least one computing unit comprises a wireless interface permitting the connected system to communicate with at least one of an external device or a network.

2. The connected system of claim 1, wherein the actuator comprises a rotatable knob which has a unique predefined setting corresponding to each one of the plurality of threat levels.

3. The connected system of claim 1, wherein, based on the outputted threat level, the boot controller selects only a subset of the plurality of computing units to reboot.

4. The connected system of claim 3, wherein the plurality of computing units are interconnected to share data, wherein the subset of the plurality of computing units includes a first computing unit directly connected to the at least one computing unit comprising the wireless interface.

5. The connected system of claim 4, wherein the first computing unit hosts an ancillary control system.

6. The connected system of claim 3, wherein one of the plurality of computing units not in the subset comprises a primary control system, wherein the primary control system affects the operational safety of the connected system.

7. The connected system of claim 1, wherein the boot controller is configured to instruct the at least one computing unit to maintain the wireless interface in an inactive state after rebooting.

8. The connected system of claim 1, further comprising:
a connected vehicle, wherein the actuator and the control system are disposed in the connected vehicle.

9. The connected system of claim 1, further comprising:
an internet of things (IoT) device, wherein the actuator and the control system are disposed in the IoT device.

10. A vehicle, comprising:
an actuator configured to output a threat level selected from a plurality of threat levels;
a control system comprising:
a plurality of electronic control units (ECUs) each comprising Iodic and configured to control a respective subsystem in the vehicle;
a boot controller communicatively coupled to the actuator to receive the outputted threat level, wherein the boot controller is configured to:
select a predefined action corresponding to the outputted threat level, wherein the predefined action comprises rebooting at least one ECU of the plurality of ECUs; and
transmit an instruction to reboot the at least one ECU, wherein the at least one ECU comprises a wireless interface permitting the vehicle to communicate with at least one of an external device or a network.

11. The vehicle of claim 10, wherein the actuator comprises a rotatable knob which has a unique predefined setting corresponding to each one of the plurality of threat levels.

12. The vehicle of claim 10, wherein, based on the outputted threat level, the boot controller selects only a subset of the plurality of ECUs to reboot.

13. The vehicle of claim 12, wherein the plurality of ECUs are interconnected to share data, wherein the subset of the plurality of ECUs includes a first ECU directly connected to the at least one ECU comprising the wireless interface.

14. The vehicle of claim 12, wherein one of the plurality of ECUs not in the subset comprises a primary control system, wherein the primary control system affects the operational safety of the vehicle.

15. The vehicle of claim 10, wherein rebooting the at least one ECU deactivates the wireless interface and deletes malicious code stored in transitory memory in the at least one ECU.

16. A method, comprising:
generating, via a movement of an actuator, a signal indicating a selection of one of a plurality of threat levels of a wireless attack to a connected system;
selecting a predefined action corresponding to the selected threat level, wherein the predefined action comprises rebooting at least one computing unit of a plurality of computing units; and
transmitting an instruction to reboot the at least one computing unit, wherein the at least one computing unit comprises a wireless interface permitting the connected system to communicate with at least one of an external device or network.

17. The method of claim 16, wherein the actuator comprises a rotatable knob which has a unique predefined setting corresponding to each one of the plurality of threat levels.

18. The method of claim 16, wherein the plurality of computing units are interconnected to share data, wherein the predefined action further comprises:
selecting a first computing unit of the plurality of computing units that is directly connected to the at least one computing unit comprising the wireless interface; and
transmitting an instruction to reboot the first computing unit.

19. The method of claim 16, wherein the plurality of computing units comprises a second computing unit including a primary control system that affects the safe operation of the connected system, wherein the predefined action does not include rebooting the second computing unit.

20. The method of claim 16, wherein transmitting the instruction comprises:
transmitting the instruction as a data signal along power lines extending between a power source in the connected system and each of the plurality of computing units.

* * * * *

UNITED STATES PATENT AND TRADEMARK OFFICE
CERTIFICATE OF CORRECTION

PATENT NO. : 11,042,635 B2
APPLICATION NO. : 16/040727
DATED : June 22, 2021
INVENTOR(S) : Yaron Sella et al.

It is certified that error appears in the above-identified patent and that said Letters Patent is hereby corrected as shown below:

In the Claims

In Column 13, Line 26, in Claim 10, delete "Iodic" and insert -- logic --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*